United States Patent Office 3,544,889
Patented Dec. 1, 1970

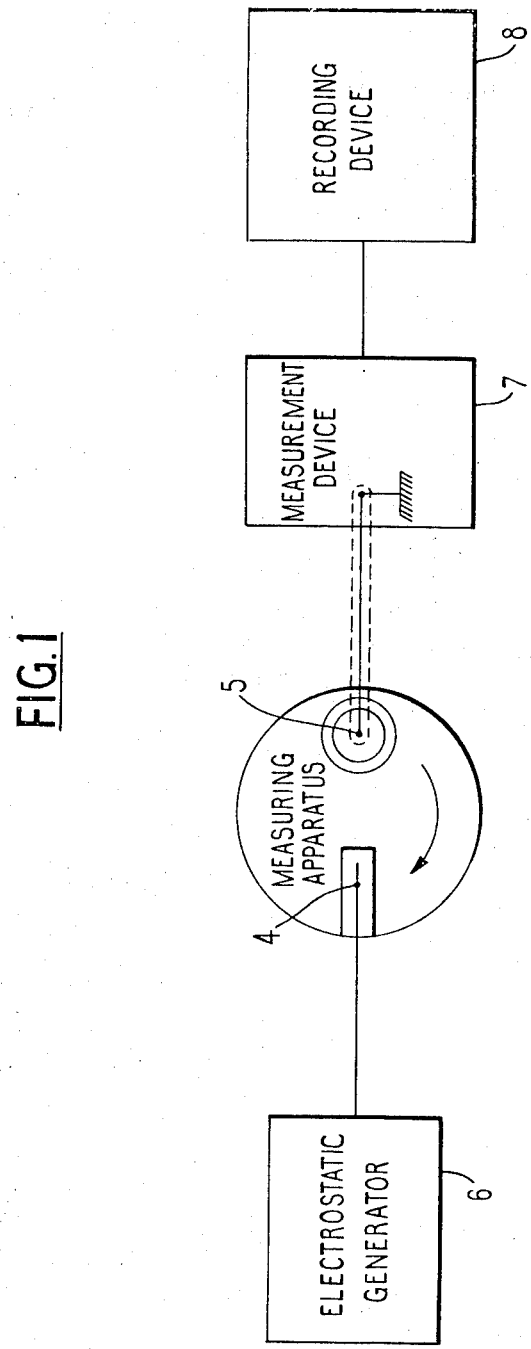

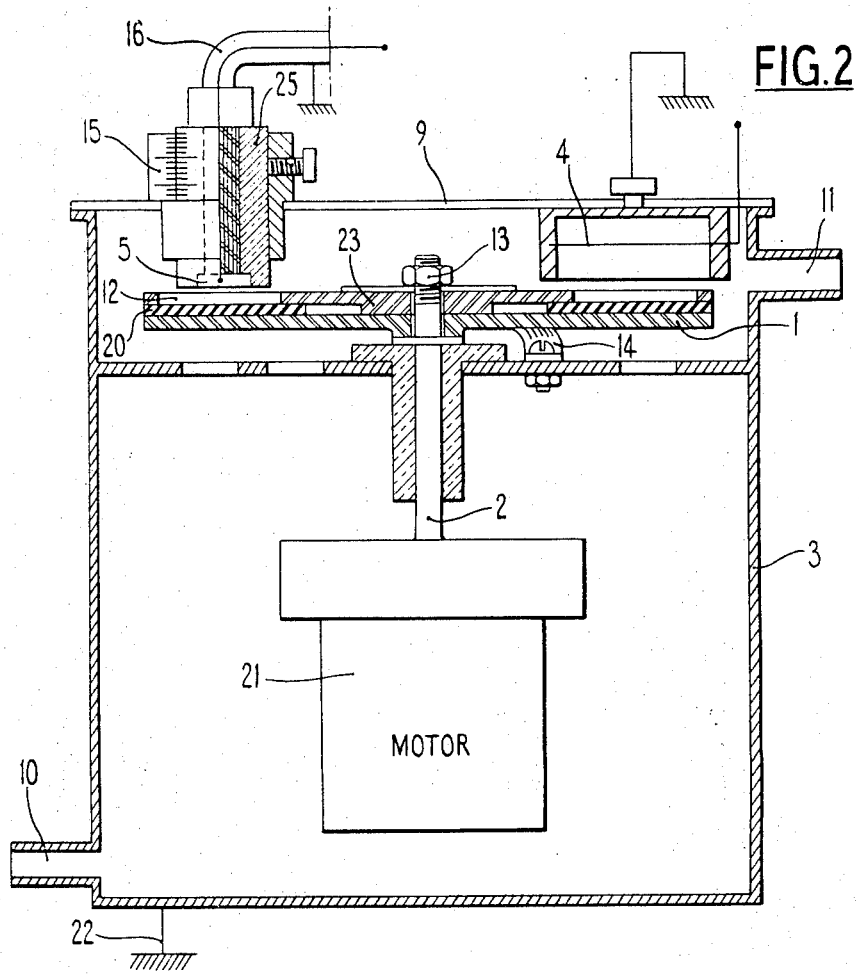
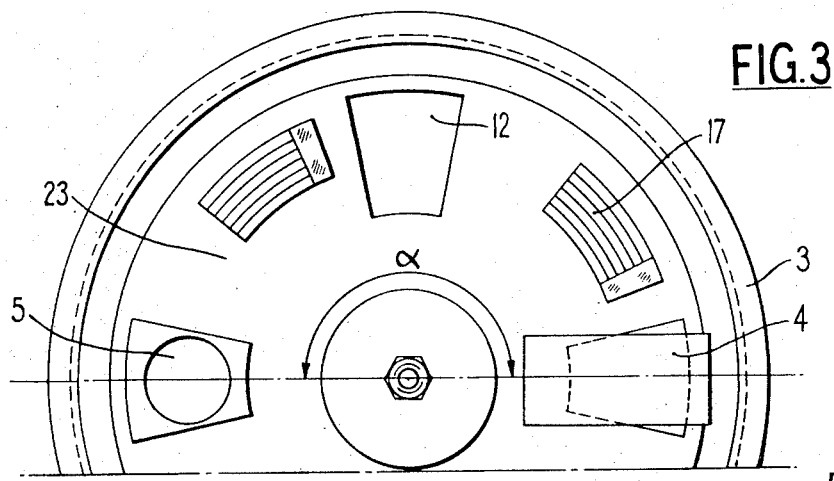

3,544,889
METHOD AND APPARATUS FOR MEASURING THE ELECTROSTATIC PROPERTIES OF PLASTIC MATERIALS INCLUDING MEANS FOR ROTATING THE MATERIALS PAST A CHARGING ELECTRODE AND A MEASUREMENT PROBE
Maurice Alauzet, La Mulatiere, and Yves Fleurquin, Oullins, France, assignors to Rhone-Poulenc S.A., Paris, France, a French body corporate
Filed Dec. 4, 1968, Ser. No. 780,995
Claims priority, application France, Dec. 4, 1967, 130,873; May 7, 1968, 150,875
Int. Cl. G01r 5/28, 29/12
U.S. Cl. 324—32
7 Claims

ABSTRACT OF THE DISCLOSURE

The specification describes a method and apparatus for measuring and recording the electrostatic characteristics of at least one sample of plastics material. The samples are placed in register with apertures in a cover plate secured to a rotatable, electrically conductive, grounded support, which is rotated so that the apertures pass adjacent a high potential charging electrode and a measurement probe. Use is made of the corona effect to charge the samples and the potential is reduced to zero, a record being made of the electrical signal transmitted by the probe.

---

The present invention relates to a method and an apparatus for studying and measuring the electrostatic surface charges of plastics.

Electrostatic charges appear easily on the surface of plastics and are frequently a nuisance. It is thus of value to be able to measure them. A most commonly used technique of measurement consists of producing electrostatic charges on the surface of the materials studied, under specific conditions, by rubbing with an appropriate device, and then measuring the change in the electric charges acquired by the material. The results obtained by this technique are of poor reproducibility.

An apparatus has also been described in the Journal of Polymer Science, volume XXXIII, pages 65–85 (1958), wherein the material studied is stretched between two metallic jaws maintained at a high potential and the change in the potential at the centre of the material is then measured. In this type of apparatus the tests are very long when testing insulating materials.

According to the present invention there is provided an apparatus for measuring the electrostatic characteristics of a plastics material, such apparatus comprising an electrically conductive earthed support plate rotatable about an axis, an electrically conductive cover plate, having at least one aperture therein, and secured to said support plate for rotation therewith, means for rotating said support plate and cover plate about said axis, a charging electrode and a measurement probe spaced therefrom, both adjacent said cover plate at a location to overlie said at least one aperture upon rotation of said support plate and cover plate, means for applying a high electrical potential to said electrode and means for measuring the electrical signals transmitted by said probe.

The invention also provides a method of measuring the electrostatic properties of at least one sample of plastics material, comprising the placing of each sample between the support plate and cover plate of the apparatus of the invention, rotating the support plate and therewith the cover plate and sample or samples, applying a high electrical potential to said electrode to charge said sample or samples to a maximum value using the corona effect, reducing the potential on said electrode to zero and measuring the electrical signals transmitted by said measurement probe.

In practice the charging electrode is radial metallic wire and is kept at a positive or negative potential of between 2 kv. and 20 kv. and preferably between 3 and 10 kv. by connecting it to an appropriate continuous high tension generator.

The measurement probe may be a flat disc and the signals emitted by the probe can be measured, amplified and recorded as desired, according to known techniques.

In order that the invention may more readily be understood, the following description is given, merely by way of example, reference being made to the accompanying drawings, in which:

FIG. 1 is a schematic diagram of one embodiment of testing arrangement including the apparatus according to the invention;

FIG. 2 is a vertical, axial sectional view of the apparatus;

FIG. 3 is a fragmentary plan top view of the apparatus of FIG. 2, with the cover being assumed to be transparent;

Figure 4:
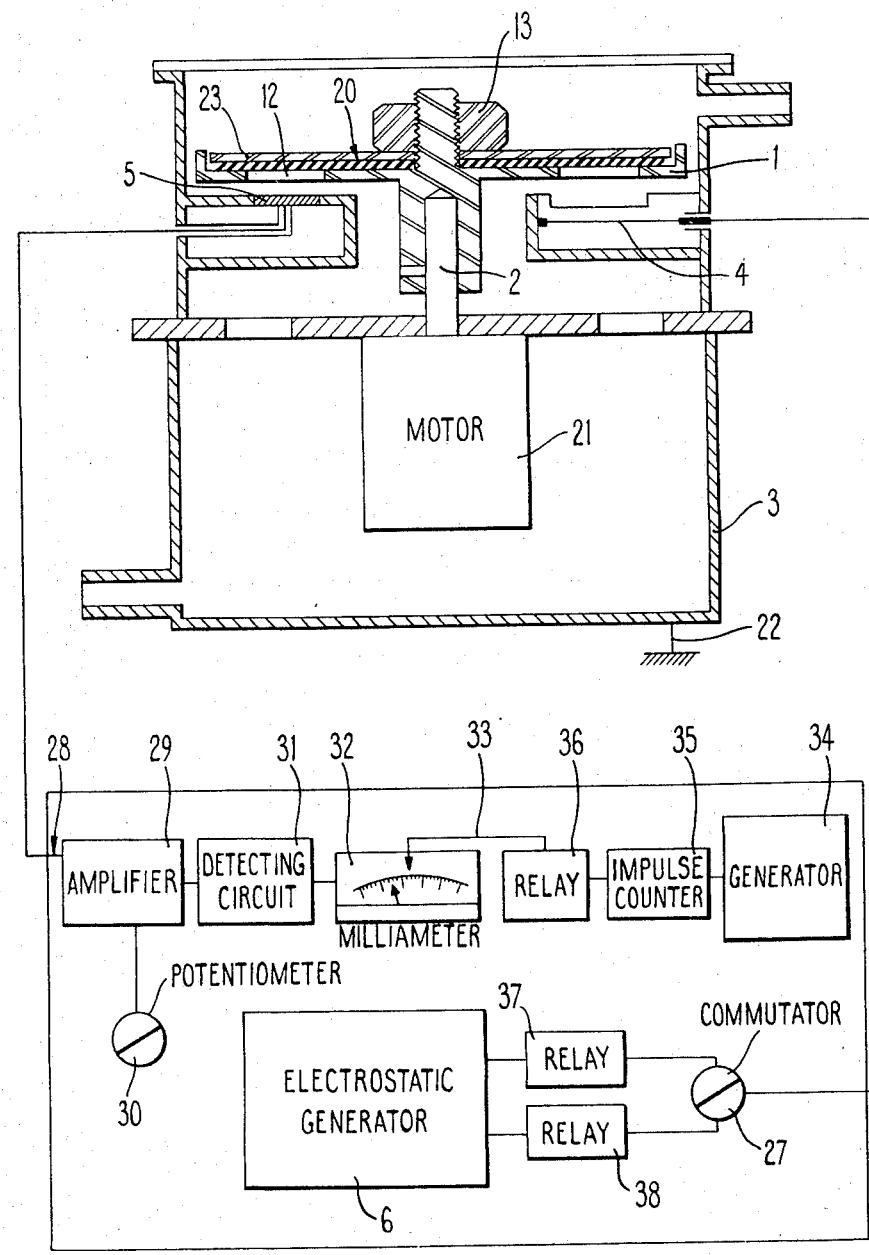
FIG. 4 is a vertical, axial sectional view of a second embodiment of the apparatus.

The apparatus represented schematically at M in FIG. 1 and in detail in FIGS. 2 and 3 consists of a support plate 1 which is mounted in a fixed case 3 to rotate about an axis 2. The support 1 and the case 3 are made of electrically conductive materials and are earthed by means of a metallic brush 14 and a conductor 22 respectively. Rotation of the support plate 1 is effected at a specific speed by an electric motor 21. Samples 20 are secured on the support 1 essentially at equal distances from the axis 2 by a cover plate 23, which is fixed by means of a nut 13, the cover plate being provided with identical apertures 12 equally spaced on a circle centred on axis 2. Each sample is thus placed in register with an aperture 12 and successively passes in front of a fixed charging electrode 4 and a fixed measurement probe 5 both adjacent to the cover plate 24.

The charging electrode 4 which consists of a radial metallic wire, for example of rhodium-plated tungsten, is connected to a conventional electrostatic generator 6 (FIG. 1) which is capable of applying a positive or negative effective continuous high potential having a constant value of between 2 kv. and 20 kv. and preferably of between 3 kv. and 10 kv. to the electrode. Spaced from the electrode 4, the measurement probe which is very heavily insulated from earth, is connected to a measurement device 7, such as a conventional electrometer which receives and amplifies the signal corresponding to the passage of a charged sample in front of the probe. The electrometer can be connected to a device 8 which is capable of recording successive signals, for example a paper recorder.

Before use, the apparatus is calibrated by arranging, in the place of the samples, an insulated conducting section of the rotor 1 which is kept at known potentials via a rotating contact. The samples to be studied, 20, are thereafter placed on the support 1 and are clamped underneath the disc 23 by means of the nut 13, after which the assembly is driven at a specific speed. The effective continuous positive or negative potential of the chosen value is applied to the charging electrode, and the samples 20 become charged by the corona effect, the potential being maintained for the time required for the samples to acquire a maximum charge, and the charging electrode is then placed under zero tension. Signals corresponding to the electrical charges transmitted by the samples each time they pass in front of the measurement probe are received and amplified by means of the electrometer, the value of the successive charges provided by each sample 20 being recorded by the device 8 over the duration of the sample's charge and discharge.

The case 3 is advantageously metallic and in the form of a Faraday cage, and is closed tightly by a cover 9 which permits easy access to the interior. Mounted on the case 3 are two tubes 10 and 11 which can be connected to a device for circulating air or gas (not shown) and it is possible to control the temperature and humidity of the air or gas accurately.

As shown, the support 1 consists of a plate, but may alternatively consist of a drum, with the other elements being correspondingly modified. Between the support and cover, $n$ samples, $n$ being an integer less than 100 and preferably less than 20, can be arranged and distributed over a disc in a circle, or over a drum along several rows, at a constant distance from the axis.

The distance between the charging electrode and the support which is normally of the order of 1 to 2 centimetres, must be regulated accurately and adjusted by, for example, a vernier device (not shown).

Again, the probe 5 is arranged parallel to the support 1 at a specific distance which is preferably precisely adjustable between 0.1 and 10 mm. and measurable by means of a vernier 15. The plate forming the receiver element has a surface area which is generally between 0.5 and 100 cm.$^2$ and preferably between 1 and 25 cm.$^2$, its shape and dimensions being preferably similar to those of the samples, e.g. it is circular. As indicated, the probe is heavily insulated and slides in a sleeve 25. The receiving element is connected to the measurement device by a screened coaxial cable 16 placed on top of the cover 9. A number of fine elastic conducting sheets 17 can be attached to the plate 23 and these come into contact with the measurement probe after the passage of each sample, thereby avoiding the accumulation of very low residual charges.

It is possible advantageously to arrange one or more measurement probes 5 on a support, the probes being spaced around the axis of the apparatus so as to be able to choose the angular distances (a) relative to the charging electrode which are most suitable for the samples studied.

FIGS. 1, 2 and 3 represent an embodiment of the apparatus according to the invention which is more particularly suitable for the simultaneous study of several samples.

In use, the support 1 can be rotated at a specific speed which is generally less than $200/n$ revolutions per minute and preferably less than $60/n$ revolutions per minute. The drive may be provided continuously by an electric motor 21 and a conventional transmission or by a stepwise device, each step being through an angle of $360°/n$. Alternatively the drive may be discontinuous, the motor being controlled by a timing device or an appropriate programming device.

The electrometer 7 is used as a coulomb meter and has a very high input impedance, generally greater than $10^{14}\Omega$, and a low output impedance, of the order of a few thousand ohms. Preferably, the electrometer output is connected to a drum-chart potentiometric recorder, which is driven synchronously at an angular speed which is very slightly different from the support 1. A suitable difference in speed, generally between 0.1% and 3%, is achieved by means of a speed reduction device provided with two output shafts, each shaft being provided with gearwheels with the number of teeth differing by one unit. Thus the successive peaks corresponding to the charges provided by a particular sample are traced within the same zone but very slightly displaced relative to one another, and this makes it possible easily to separate the characteristic curves of each sample (see FIGS. 5 and 6). The curves, surrounding the peaks, which are observed or recorded as a function of time under specific conditions, are characteristic of the electrostatic behaviour of the plastics materials of the samples studied. It is in particular of practical value to observe the half-discharge time, that is to say the time required for the charge to fall to half its maximum value.

FIG. 4 represents another embodiment of apparatus according to the invention. The charging electrode and the measurement probe are here advantageously arranged underneath the plate, thereby facilitating the handling of the samples and making it possible to maintain a constant distance between the samples on the one hand and the charging electrode and the measurement probe on the other.

Such an apparatus can be adapted to studying a single sample at a time. The support 1 is provided with identical apertures 12 centred on a coaxial circle and uniformly spaced in such a way that on this coaxial circle the shortest distance between two consecutive apertures is essentially equal to the width of one aperture. The apertures 12 are generally of a symmetrical shape relative to a radial plane so as to provide a symmetrical signal. For ease of manufacture, it is preferable to use circular apertures. The support is driven at a constant speed which is generally above 200 revolutions per minute by means of an electric motor 21.

The polarity of the charging electrode can be selected by means of high tension relays 37 and 38 and a commutator 27. Measurement of the signals transmitted by the probe is effected using a circuit 28 including an amplifier 29, having a potentiometer gain control 30, a detecting circuit 31 for the amplified signal and a moving frame milliammeter 32. Linked to the milliammeter is a counting circuit 33 comprising a generator 34, which delivers electrical impulses at regular intervals and one or more impulse counters 35, each controlled by a relay 36, which itself is actuated by the needle of the milliammeter. The time which the charge takes to fall to half, one-third, etc. of its initial value can thus be determined.

In operation, the sample 20 is placed on the support 1, so that it covers all the apertures 12, and is kept in position by the plate 23 and nut 13, the support then being driven at a constant speed. A potential is applied to the electrode the polarity being chosen by means of the commutator 27 and the sample becomes charged by the corona effect.

The input circuit essentially consists of resistances, having a low impedance, the input signal being proportional to the variation with respect to time in the electrical field caused by the passage of the charged sample at the level of the apertures. As a first approximation the curve showing the variation of this electrical field is the derivative, with respect to time, of the electrical charge detected by the measurement probe through the apertures. At the time when an aperture passes in front of the measurement probe, the charge detected first increases and then decreases and the measured curve thus has an alternating shape. Since two consecutive apertures 12 are periodically adjacent to the measurement probe, two consecutive alternations succeed one another without discontinuity and the combination of the signals received forms a continuous series of alternations. This alternating signal is thus easily amplified and detected without it being necessary to use an electrometer; since the amplitude of the alternations is proportional to the electrostatic charge retained by the sample, the deflection of the milliammeter makes it possible to read this charge directly given prior calibration. When the charge of the sample reaches the maximum value, the gain control 30 of the amplifier is actuated so as to bring the milliammeter needle to a specific position, the charging electrode is then brought to zero tension and the progress of the discharge is followed as a function of time.

This apparatus can also be used with a cathode ray oscilloscope as the signal detector. The speed of sweep of the oscilloscope can be synchronised with the speed of rotation of the support. As many peaks can be caused to appear on the screen of the oscilloscope as there are apertures in the support. Several samples can thus be studied simultaneously and in comparison.

This method and apparatus makes it possible to study and make measurements on plastics in the form of samples of greatly varying thicknesses and shapes, e.g. films, sheets, tufted materials, fabrics, paints, varnishes, coatings, wires wound on plates, powders after being tabletted in a press, and pastes smoothed by means of a spatula, under precise conditions of temperature, humidity and light. They also make it possible to study antistatic agents of which the resistance to rubbing is mediocre. Precise and reproducible measurements are obtained. The results can be immediately used and this is because the apparatus is simple and easily operated.

EXAMPLE 1

The apparatus shown in FIGS. 2 and 3 was used. It consisted of a steel case within which a duralumin disc of 120 mm. diameter, rotatable about a vertical axis, could hold four plastic samples of size 2 x 3 cm. The case and the disc were electrically earthed. This disc was covered by a tempered steel disc of the same diameter held by means of a nut and provided with four apertures and four elastic lamellae. This disc could hold up to 4 samples and the lamellae removed any residual charge from the measurement probe after the passage of each sample. The sample-holder device made up in this way was driven at constant speed by an electrical motor and a speed reducing device, the case being provided with a cover which carries the charging electrode and the measurement probe.

The charging electrode consisted of a radial tungsten wire of 0.1 mm. diameter, 10 mm. above the support disc, and was connected to a high potential generator which was capable of providing an effective continuous tension of between —10.4 kv. and +10.4 kv. The generator included a transformer providing a potential of 3.7 kv. and a voltage-doubling rectifier.

Figure 5:
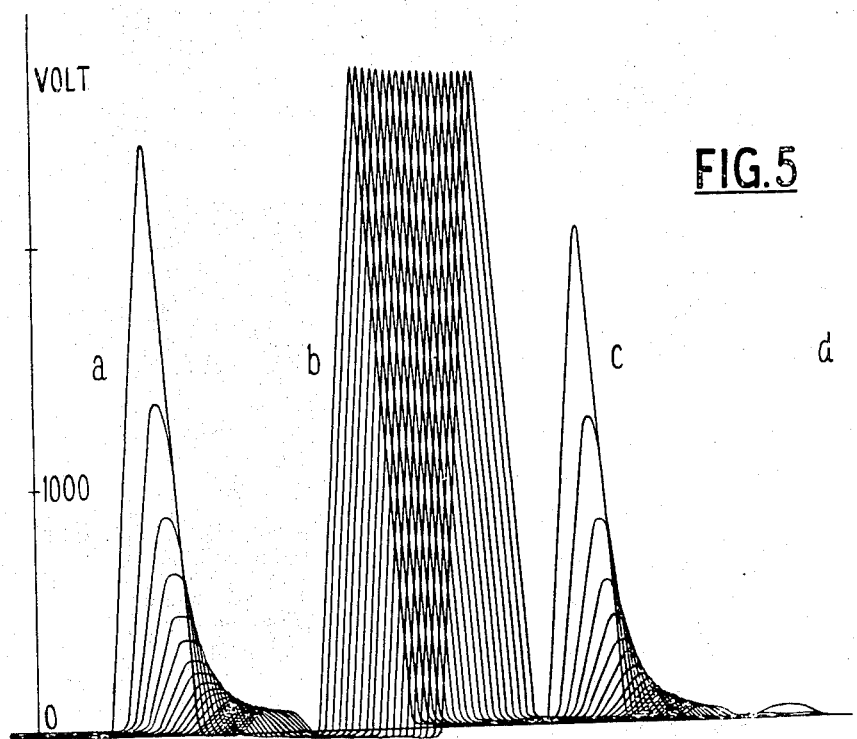
FIGS. 5 and 6 represent collections of curves recorded using the method and apparatus of the invention.

The measurement probe consisted of an electrode in the form of a disc of 1.9 cm.$^2$ surface area which was insulated by means of polytetrafluorethylene inside a brass screen slidable in a metallic sleeve. The distance of the probe from the samples could thus be adjusted to about 0.1 mm. by means of a micrometer screw and its position was located by means of a vernier. The angular distance $a$ between the charging electrode and the measurement probe was adjusted to 45° in accordance with the direction of rotation of the disc. The probe was connected by means of a coaxial cable to an electrometer used as a coulomb meter having an input resistance of $10^{14}\Omega$ and with its sensitivity adjusted to $10^{-6}$ coulombs. Successive charges were recorded on a drum apparatus of which the full scale time of response was 2.4 seconds, and around the drum of which a sheet of paper was rolled and the edges glued to one another. The drum was driven at a speed which was staggered by 0.8% relative to the speed of the sample-carrier disc so that the successive peaks relating to each sample were recorded in the same zones. A thin disc of an elastomeric conductor which carried the samples and compensated for slight non-uniformities in their thickness was placed on the duralumin disc, and four samples in the form of a film were then placed on top. The nature and thickness of these samples are respectively as follows:

(A) cellulose acetate—80$\mu$ thickness
(B) polyethylene glycol terephthalate—100$\mu$ thickness
(C) polyvinyl chloride—30$\mu$ thickness
(D) polyvinyl alcohol—60$\mu$ thickness The steel cover disc was put in place and the whole tightened by locking the nut. Air conditioned to 23° C. and 52% relative humidity was circulated within the case and the rotor driven at a constant speed of 4 revolutions per minute. The charging electrode was raised to an effective potential of —6700 volts. When the four samples were charged, the recorder was put into operation at the rotation following the charging electrode being brought to zero tension. The recording obtained is shown in FIG. 5, with the abscissae representing the time and the ordinates representing the measured voltage. The peaks corresponding to the passages of each sample in front of the measuring electrode can be observed. As a result of the way the paper is driven the peaks are grouped for each sample and it is thus easy to follow and differentiate between the discharge curves of each sample.

EXAMPLE 2

Figure 6:
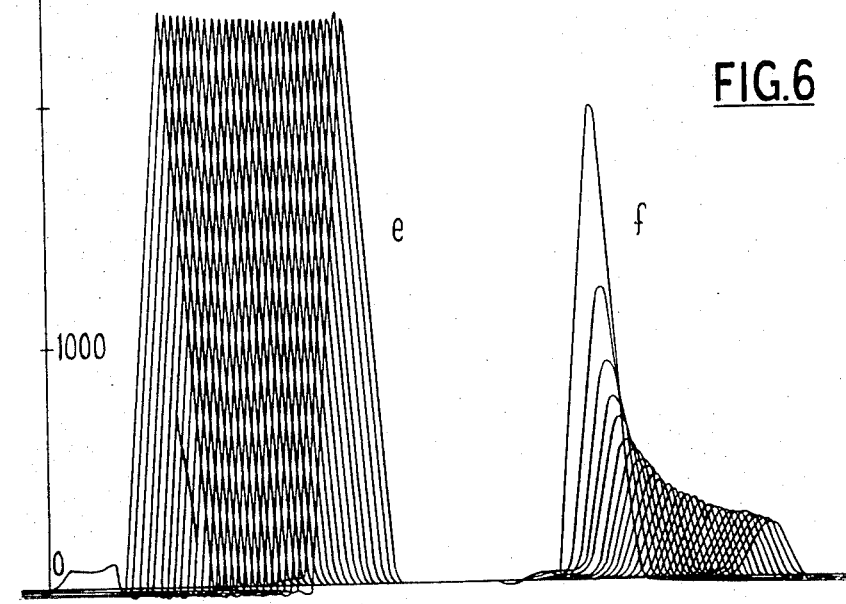

The charge acquired by two samples and the course of their discharge was studied under the same conditions as in Example 1 and with the same apparatus. These samples consisted of films of polyethylene glycol terephthalate of which one was coated with an antistatic agent. The sample was coated by deposition of a 15 microns thick film obtained by evaporation of an 0.2/000 by weight solution of polyoxyethylated laurylamine in ethyl alcohol. The curves obtained are represented in FIG. 6. The group of curves E corresponds to the untreated sample and the group of curves F to the sample which has undergone the antistatic treatment. By comparing the curves obtained it is easy to check the effectiveness of an antistatic treatment by proceeding in accordance with the invention.

EXAMPLE 3

The apparatus essentially consists of two cases; one case receiving the sample as shown in FIG. 4, and the other case groups together the control units.

A horizontal duralumin disc of 100 mm. diameter was arranged inside the first duralumin case; this disc was perforated by 9 apertures of 14 mm. diameter distributed uniformly over an 80 mm. diameter circle and was capable of holding a sample of 100 mm. diameter. The sample was held in position by a continuous duralumin disc tightened by means of a nut. The rotor assembly was driven by a synchronous motor revolving at 1500 revolutions per minute, the case and disc being electrically earthed.

The charging electrode and the measurement probe were fixed diametrically opposite to one another on the case. The charging electrode consisted of a horizontal tungsten wire of 0.02 mm. diameter stretched along the axis of a cylindrical brass tube possessing a longitudinal slit and kept insulated by polytetrafluorethylene plugs. The measurement probe consisted of a brass disc of 15 mm. diameter insulated by a polytetrafluorethylene sleeve inside a brass tube. The distances of the filament of the charging electrode and of the measurement probe from the inner face of the disc were adjustable between 0.2 and 10 mm.

The following units were arranged within the second case:

(a) the high tension generator connected to the charging electrode. It allowed a continuous effective tension of ±4300 volts to be applied.
(b) a commutator and two high tension relays 37 and 38 which allowed the polarity to be selected.
(c) the measurement circuit connected to the measurement probe and consisting of:
  a transistor amplifier with gain control by a logarithmic potentiometer,
  a detection circuit,
  a scale milliammeter provided with two photoresistant devices each capable of controlling a relay which throws when the needle reaches predetermined positions.

(d) the counting circuit consisting of:
an electrical impulse generator,
two impulse counters,
two relays controlled by the needle of the milliammeter and adjusted to cause the corresponding counter to stop from discharge levels of 50% and 75% onwards.
(e) the various control buttons, indicators and interruptors.

Three samples in the form of films were successively studied with this apparatus. Each sample was subjected to a continuous high tension of −4300 volts for 10 seconds; the course of the discharge was then observed, noting the time corresponding to a discharge of 50% and a discharge of 75%. The results obtained are given in the table below.

| Nature of the sample | Thickness of film in microns | Charge acquired, volts | Time for 50% discharge, secs. | Time for 75% discharge, secs. |
|---|---|---|---|---|
| Cellulose acetate | 80 | 700 | 60 | 350 |
| Polyvinyl chloride | 30 | 600 | 70 | 300 |
| Polyvinyl alcohol | 60 | 150 | 1 | 2 |

We claim:
1. A method of measuring the electrostatic surface characteristics of at least one sample of plastics material, said method comprising the steps of:
(i) providing an electrically conductive grounded support plate and cover plate having at least one aperture therein, and both rotatable about a common axis;
(ii) providing a charging electrode and a measurement probe at spaced locations relative to said cover plate;
(iii) securing said sample to be measured between said support and cover plate and in register with said aperture;
(iv) rotating said support plate, cover plate and sample about said axis;
(v) applying a high potential to said charging electrode, to produce the corona effect for a sufficient time to charge said samples;
(vi) reducing the potential on said charging electrode to zero; and then
(vii) measuring electrical signals transmitted by said measurement probe.

2. Apparatus for measuring the electrostatic surface characteristic of at least one sample of plastics material, said apparatus comprising, in combination:
(a) an electrically conductive grounded support plate rotatable about an axis;
(b) an electrically conductive grounded cover plate secured to said support plate for rotation therewith;
(c) means defining at least one aperture in said cover plate; said ground support plate and said cover plate being adapted to secure the sample between said plates in register with said aperture;
(d) means for rotating said support plate and cover plate about said axis;
(e) a charging electrode adjacent said cover plate, at at radial location passed by said at least one aperture;
(f) means for applying a high electrical potential to said charging electrode;
(g) a measurement probe adjacent said cover plate and in spaced apart relation to said charging electrode at a radial location passed by said at least one aperture; and
(h) means for measuring the electrical signals transmitted by said probe.

3. Apparatus as claimed in claim 2, wherein said charging electrode comprises a radially extending metallic wire.

4. Apparatus as claimed in claim 2, wherein said measurement probe is a flat disc parallel to said support plate.

5. Apparatus as claimed in claim 2, wherein said aperture defining means define a plurality of equally spaced apertures arranged in a circle centered on said axis.

6. Apparatus as claimed in claim 5, wherein said apertures are identical circular apertures, peripherally spaced apart by a distance equal to the diameter of each of said apertures and wherein said measurement probe is a circular flat disc having a greater diameter than each of said apertures.

7. Apparatus as claimed in claim 2, and further comprising means to record readings of said measuring means.

References Cited

UNITED STATES PATENTS

| | | | |
|---|---|---|---|
| 2,421,430 | 6/1947 | Ott | 324—32 |
| 2,965,755 | 12/1960 | West | 324—54UX |
| 2,982,822 | 5/1961 | Bacon | 324—61X |
| 3,124,172 | 3/1964 | Paxson | 317—3X |
| 3,225,299 | 12/1965 | Middendorf | 324—70 |
| 3,364,423 | 1/1968 | Moulton | 324—72 |
| 3,449,658 | 6/1969 | Robinson et al. | 324—32 |

GERARD R. STRECKER, Primary Examiner

U.S. Cl. X.R.

324—72